May 19, 1931. J. A. A. DE VIZCAYA 1,806,523
VEHICLE BODY
Filed Oct. 31, 1927 5 Sheets-Sheet 1

Jean A.A. de Vizcaya
Inventor
Louis Barnett
Attorney.

May 19, 1931.  J. A. A. DE VIZCAYA  1,806,523
VEHICLE BODY
Filed Oct. 31, 1927  5 Sheets-Sheet 2
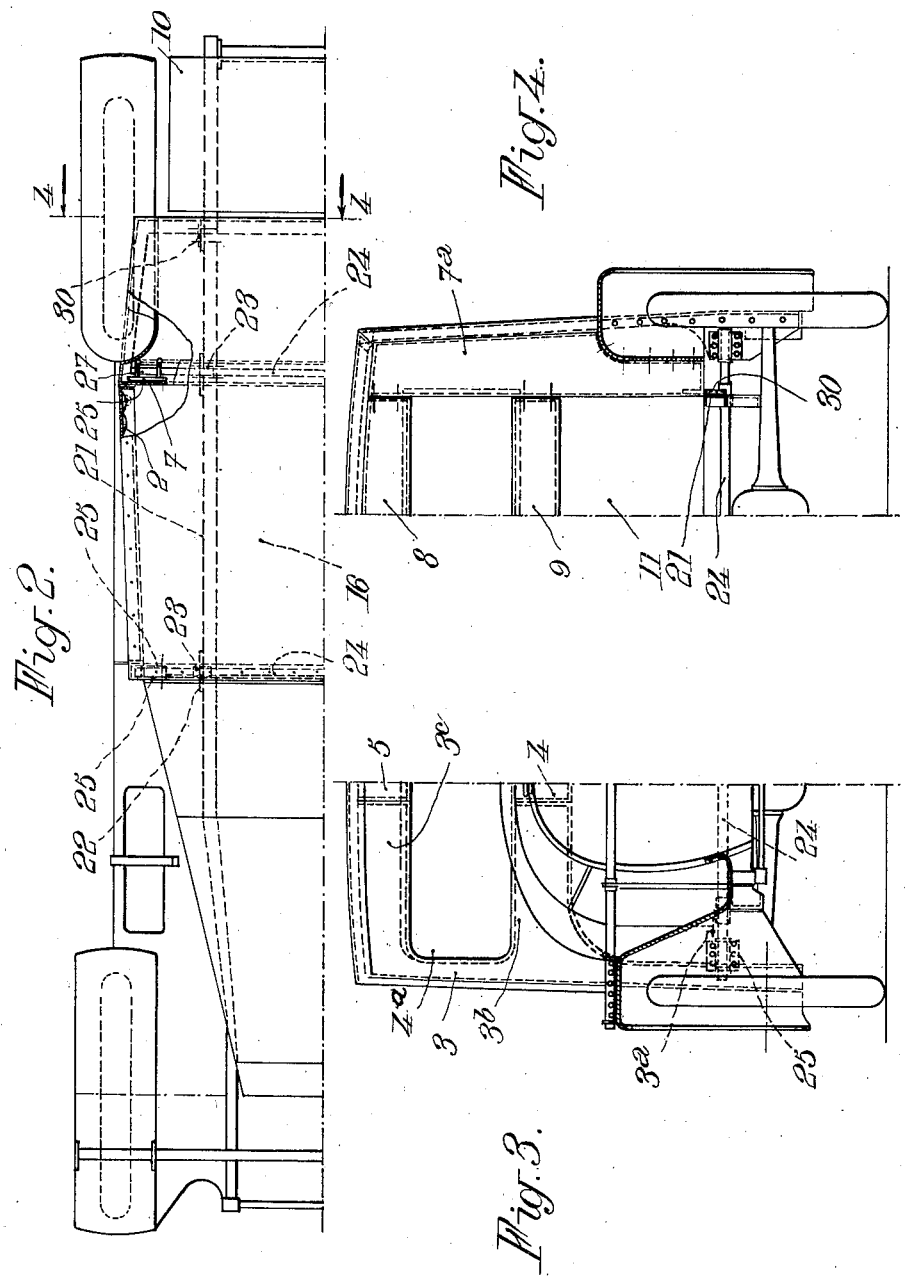
Jean A. A. de Vizcaya
Inventor
Louis Barnett
Attorney.

May 19, 1931.  J. A. A. DE VIZCAYA  1,806,523
VEHICLE BODY
Filed Oct. 31, 1927  5 Sheets-Sheet 3
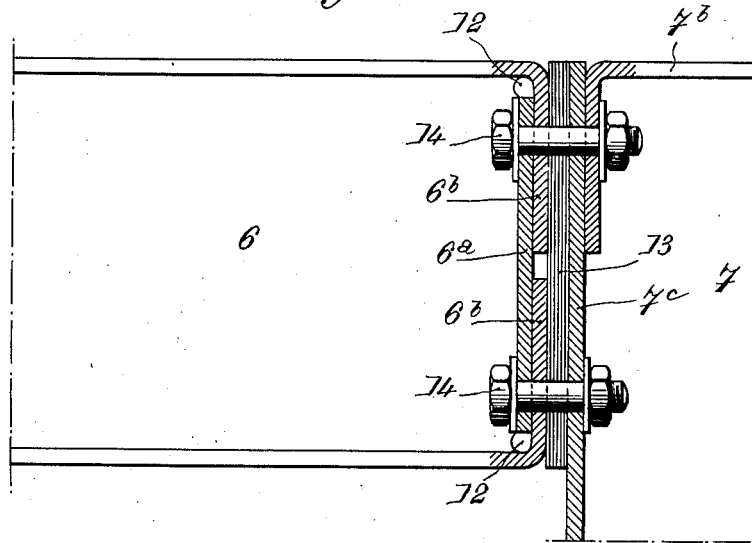
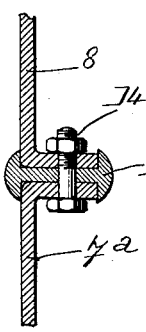
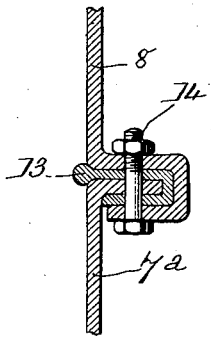
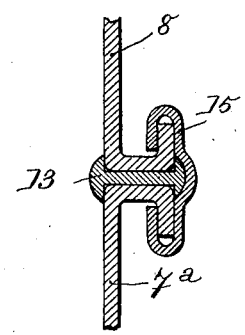
Jean A. A. de Vizcaya
Inventor.
Louis Barnett
Attorney.

May 19, 1931. J. A. A. DE VIZCAYA 1,806,523
VEHICLE BODY
Filed Oct. 31, 1927  5 Sheets-Sheet 4
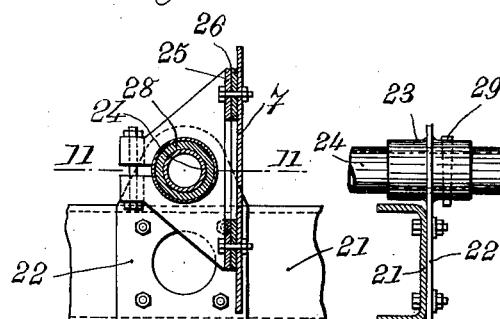
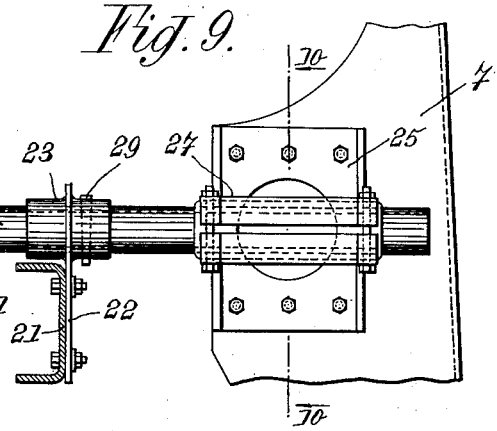
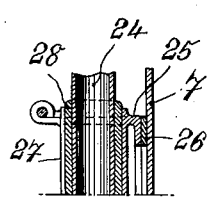
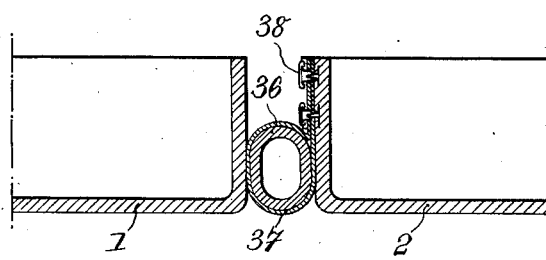
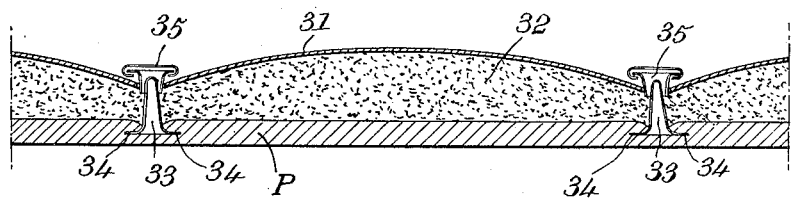
Jean A. A. de Vizcaya
Inventor
Louis Barnett
Attorney

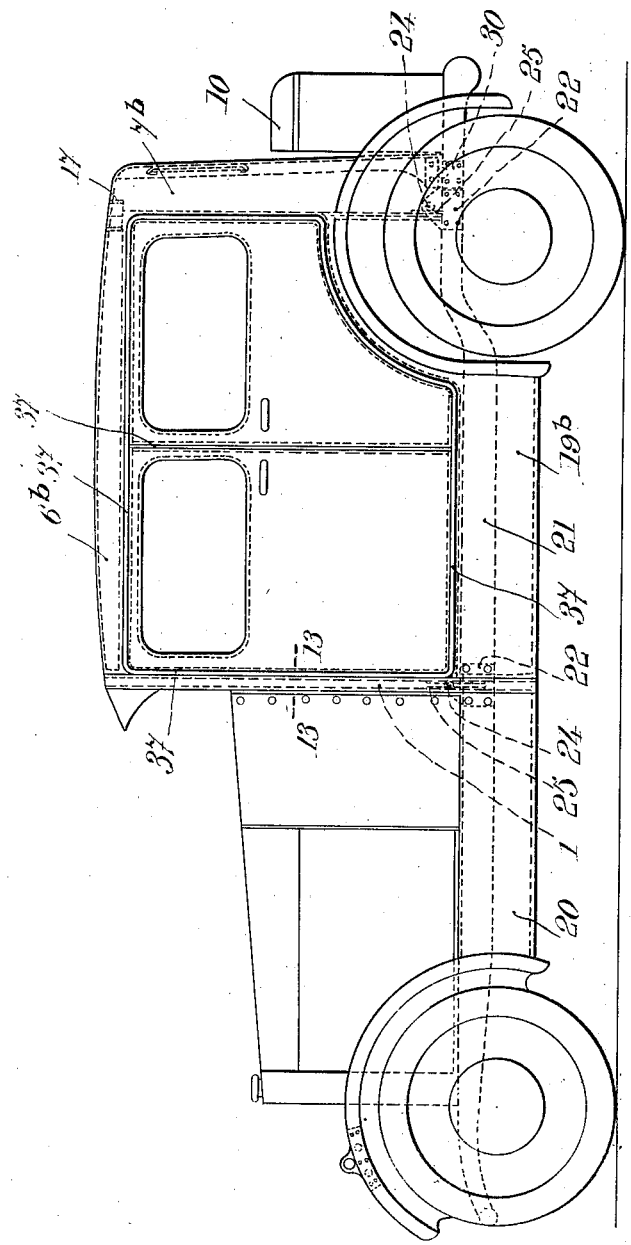

Patented May 19, 1931

1,806,523

UNITED STATES PATENT OFFICE

JEAN ANTOINE AUGUSTIN DE VIZCAYA, OF PARIS, FRANCE

VEHICLE BODY

Application filed October 31, 1927, Serial No. 229,914, and in France November 6, 1926.

The present invention relates to vehicle bodies and, more particularly to those of the type designed to be mounted on an automobile chassis.

One of the objects of the invention is to provide a sectional form of automobile body capable of being assembled and held in place without the aid of any kind of supporting framework.

Another object is to provide a special sectional form of assembly in which the largest and most complicated parts or sections are made of constant size irrespective of the size of the chassis.

A further object is to provide an assembled form of section, that is to say, one provided with upholstery and the like, which may be mounted in place with other sections finished both inside and out.

Still further objects will appear in the course of the detailed description now to be given with reference to the accompanying drawings, in which:—

Fig. 2 is a half plan, partly in section, of the same body;

Fig. 3 represents a front view, with certain parts in section, of half of the assembled body;

Fig. 4 is a transverse section taken on line 4—4 of Fig. 2;

Fig. 5 shows, on an enlarged scale, the manner of assembling a pair of sections;

Figs. 6 to 8 show partial sections showing other modes of assembly;

Fig. 9 is a partial elevation, with certain parts in section, of the manner of mounting the special supporting cross-pieces on the chassis;

Fig. 10 represents a vertical section on line 10—10 of Fig. 9;

Fig. 11 is a horizontal section taken on line 11—11 of Fig. 10;

Fig. 12 illustrates, in section, the manner in which the upholstery and similar fitting are attached to the sections.

Fig. 13 is an enlarged section taken on line 13—13 of Fig. 1.

Fig. 14 is a side elevation of a body assembly provided with double doors.

Figure 1:
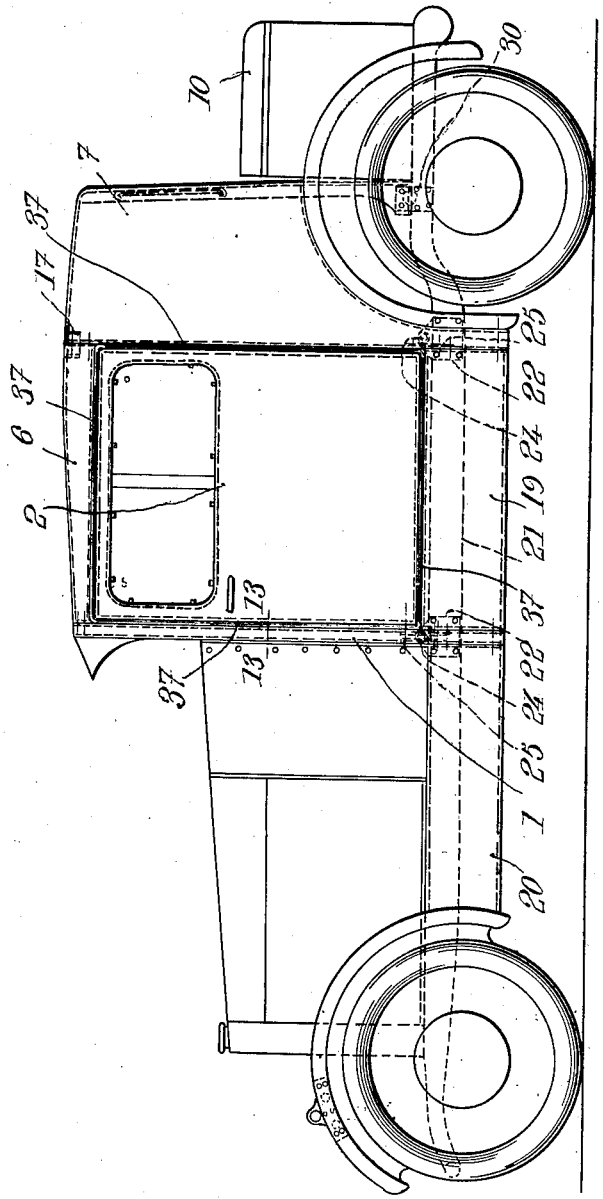
Fig. 1 represents, in elevation, an assembled body mounted on an automobile chassis.

Referring to the various figures of the drawings, there is shown a sectional body including:—a pair of symmetrical sections 3 forming the front of the body, each of said sections comprising vertical side members 1 designed to limit one side of hinged closure 2, a descending portion $3^a$ destined to support the body on the chassis, a lower horizontal portion $3^b$ adapted to receive the instruments and other structures usually connected in the vicinity thereof, and $3^c$ an upper horizontal cross portion extending between vertical end portions;—a window or wind-shield $4^a$ mounted in appropriately shaped grooves formed along the edges of $3^b$ and $3^c$;—intermediate sections 4 and 5, each of a length depending on the width of the vehicle, and held in place in a manner to be described between opposite sections 3, 3;—an upper horizontal lateral section 6, forming the upper frame for the door;—a pair of lateral members 7 coacting with section 6, said members 7 being bent at right angles to form symmetrical rear segments $7^a$, $7^a$ constituting latero-posterior sections;—a pair of horizontal end sections 8 and 9 spaced to receive and support a rear window;—and (where, as shown, in the drawing, a trunk is to be mounted on the rear) a section 11 of leather or similar material, filling the space between section 9 and the chassis.

Preferably the edges of each section are bent at right angles toward the interior part of the body to give rigidity to the section and to serve as a means for joining (Fig. 5) adjacent sections together. Bolts passing through the bent-over edges serve to hold contiguous elements rigidly in position, appropriate resilient material being interposed if desired. As illustrating a typical joining assembly, the joint between members 6 and 7 is shown in Fig. 5. Here lateral member 6, having a U-shaped section is pierced at two points 12 adjacent one end and the end pieces $6^a$ and $6^b$ are cut out and folded over at right angles so as to occupy the relative positions shown in the drawing. Holes 12 prevent tearing or cracking during the folding over operation. The upper edge 7$^b$ of section 7 is folded over against lateral edge 7$^c$ which has also been bent inwardly and which constitutes the rearward frame for the door. A sheet of rubber or similar resilient material 13 is interposed between the sections and bolts 14 inserted and tightened against washers to complete the assembly.

Fig. 6 shows the type of joint consisting merely of a resilient gasket 13 and bolts 14 which can be used along the abutting edges of contiguous sections 7$^a$ and 8.

Fig. 7 illustrates a variant of the joint represented in Fig. 6 in which the edge of section 8 is bent into the shape of a U and bolt 14 is tightened transversely of the U against gasket 13 which here is also U-shaped.

In Fig. 8, a further variant is shown, in which the bent over edges are formed with flanged portions. The bolts are here eliminated by bending a tie-member 15 over the flanged portions of the edges. This form of joint is less desirable than the ones shown in Figures 5 to 7 since it cannot be disassembled as conveniently as the one involving the use of bolts as tie members.

The roof may be made of one or more rigid sections 16 (Fig. 2) supported, on the front, latero-posterior and lateral sections and, optionally, by a U-shaped crossbeam 17, by the form of joint already described.

Sections 19 and 20 may be attached to the bottom of the assembly to constitute a bottom trimming, or may be formed integrally with the running board. Section 19 forms the bottom framing member for the door.

The floor of the body is connected directly to the chassis, and the edges of the assembled shell are attached to the floor by a leather or similar joint (not shown) insuring complete closure of the completed assembly.

The sectional shell may be attached to the chassis in the following way: 4 plates 22 are rigidly bolted onto longitudinals 21, and carry supporting tubes 23; a pair of transverse rods or tubes 24 pass through corresponding pairs of tubes 23 and support the body by means of a split tube 27 fitted with appropriate bolt clamps and lined with a resilient sleeve 28, said split tube supporting a plate 25 and gasket 26 bolted to the body. A key or screw 29 prevents movement of elements 24 in tubes 23. As will be seen from Figures 1, 2 and 4, plates 25 are attached to the bent over front edge of latero-posterior section 7 in the rear. In the front, the manner of attaching the supporting tube to the body is somewhat different since, here split-tubes 27 being connected to parallel plates 25 mounted on the branches of the U formed by front vertical elements 1. The fixation of the body on the chassis is completed by two leather bands 30 extending from longitudinals 21 to segment 7$^a$ of latero-posterior section 7.

All the sections are painted or enamelled exteriorly and finished interiorly with upholstery and the like so that the body is finished and ready for use as soon as assembled.

Where upholstery is needed, proper covering material, leather, cloth or the like 31, is stretched over the section wall P (Figure 12), stuffing is inserted between the former and the latter, and the covering material is fixed in place in any way desired. Since the means for fixing the covering material in place cannot traverse wall P without defacing the outside of the section, the following special fixing means has been devised: A series of blind holes are bored part way through wall P, and a male portion of a button 33 having a bent over flexible edge 34 is inserted into each hole and fixed therein by pounding edge 34 down with an appropriate tool as shown successively at the left and right of Fig. 12. The upstanding part of element 33 extends through the covering material and it is only necessary to cap said part 33 with a properly formed female element 35, which is itself covered or decorated as desired, to complete the assembly.

The door 2 is mounted in place on vertical hinges in the usual way. If a 4 door body is desired (it being asumed that the chassis is sufficiently long), longer sections 6$^b$ and 19$^b$ are used and a pair of doors suspended in the usual way with, or without, the interposition of a vertical dividing section (not shown). Preferably, the dividing section is eliminated for the sake of simplicity and also to facilitate repairs to be made underneath the floor body. To diminish rattling of the doors in their frames a leather covered rubber tube 36, 37 is mounted on the edge of the door by means of a two part rivet 38 similar to the one described for upholstering the body sections (33, 34, 35, Fig. 12).

From the foregoing, it will be seen that any size chassis may be fitted with a body by mounting "standard" front and latero-posterior sections 3 and 7 or 7$^b$ in place,—these sections being of constant size for a given type of the chassis,—and inserting front sections 4 and 5, and rear sections 8 and 9 of proper length,—which will, of course, vary with the size of the chassis,—to produce a body having the length and width desired.

In case of accident, or damage to any section, that section may be taken out and replaced by another by any unskilled person. The invention presents particular advantages as concerns shipment for export. Bodies have, heretofor, been shipped ready mounted on the chassis to avoid the difficulty in reassembly and to prevent damage. The present invention does away with the waste of space inherent in this mode of shipment, by providing a "knockdown", easy assembly form of body capable of being produced from standardized parts.

What I claim is:—

1. A vehicle assembly comprising a chassis, a pair of symmetrical front sections, an intermediate section extending between said front sections, a pair of symmetrical lateroposterior sections forming part of the lateral and part of the rear walls of the body, a pair of rear sections forming part of a rear window frame and extending between the symmetrical latero-posterior sections, a pair of upper and a pair of lower lateral sections extending between the symmetrical front and latero-posterior sections and forming part of a door frame, a roof section, means for rigidly fastening contiguous sections together, a pair of doors hingedly supported by the sectional assembly, and means for detachably supporting all of the foregoing elements on the chassis in the aforementioned relation.

2. A vehicle body assembly comprising the combination with a chassis frame of lateroposterior sections of fixed dimensions and front sections of fixed dimensions, means for securing said latero-posterior sections in spaced relation on the chassis frame, means for securing said front sections in spaced relation on said chassis frame, intermediate rear, side, and front sections positioned between said sections of fixed dimensions, said latero-posterior and front sections adapted to be mounted in varying spaced relation whereby intermediate sections of different dimensions may be inserted to vary the size of the body.

3. In a vehicle body assembly the combination with a chassis frame of a plurality of separate units assembled therewith, said units comprising a pair of symmetrical latero-posterior sections, a pair of similar front sections spaced from said rear sections and forming the sides of a door frame, a longitudinal section forming the top of the door frame, said latero-posterior and front sections mounted on the chassis in spaced relation, said top frame section corresponding in length with the space between said rear and front sections whereby to produce a door frame of the desired size and a door mounted in said frame.

4. In a vehicle body assembly, a pair of symmetrical front sections, an intermediate section positioned between said front sections, a pair of symmetrical latero-posterior sections forming part of the lateral and part of the rear walls of the body, lateral sections extending between said front and latero-posterior sections, a rear section extending between said latero-posterior sections and positioned so as to form part of a rear window frame, a roof section mounted on said front and latero-posterior sections, and means for securing all of the foregoing sections in their aforesaid relative positions.

In testimony whereof I have hereunto set my hand.

JEAN ANTOINE AUGUSTIN de VIZCAYA.